(12) United States Patent
Hada et al.

(10) Patent No.: US 11,938,995 B2
(45) Date of Patent: Mar. 26, 2024

(54) STEERING WHEEL

(71) Applicant: Autoliv Development AB, Vargarda (SE)

(72) Inventors: Shoutarou Hada, Kanagawa (JP); Shunichiro Shinmen, Kanagawa (JP); Masaji Hasegawa, Kanagawa (JP); Adonis Egdane, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 17/757,534

(22) PCT Filed: Oct. 23, 2020

(86) PCT No.: PCT/JP2020/039922
§ 371 (c)(1),
(2) Date: Jun. 16, 2022

(87) PCT Pub. No.: WO2021/124678
PCT Pub. Date: Jun. 24, 2021

(65) Prior Publication Data
US 2023/0082806 A1    Mar. 16, 2023

(30) Foreign Application Priority Data
Dec. 19, 2019  (JP) ................... 2019-229288

(51) Int. Cl.
*B62D 1/06* (2006.01)
*B62D 1/08* (2006.01)

(52) U.S. Cl.
CPC ................... *B62D 1/06* (2013.01); *B62D 1/08* (2013.01)

(58) Field of Classification Search
CPC . B62D 1/04; B62D 1/06; B62D 1/065; B62D 1/08; B62D 1/10
See application file for complete search history.

(56) References Cited

U.S. PATENT DOCUMENTS

| 5,761,968 A | 6/1998 | Poteet |
| 2003/0066379 A1* | 4/2003 | Kobayashi ............. B62D 1/166 74/552 |

(Continued)

FOREIGN PATENT DOCUMENTS

| CN | 101374715 A | 2/2009 |
| CN | 103260995 | 8/2013 |

(Continued)

OTHER PUBLICATIONS

Microfilm of the specification and drawings annexed to the request of Japanese Utility Model Application No. 67095/1989 (Laid-open No. 5675/1992) (Toyoda Gosei co., LTD.) Jan. 21, 1991 (Jan. 21, 1991), p. 9, line 20 to p. 10, line 12, fig. 7-9.

(Continued)

*Primary Examiner* — Vinh Luong
(74) *Attorney, Agent, or Firm* — Matthew D. Thayne; Thayne and Davis LLC

(57) ABSTRACT

A steering wheel includes a boss connected to the steering shaft and steering portions arranged around the boss, and the steering portion has a non-circular portion including a corner portion or an end portion, where the non-circular portion is covered with one or more cover pieces. Preferably, the one or more cover pieces cover the front surfaces facing the occupant in the non-circular portion, the rear surfaces positioned on the opposite side of the occupant, and the upper surfaces positioned between the front surface and the rear surface.

14 Claims, 14 Drawing Sheets

(56) References Cited

U.S. PATENT DOCUMENTS

| | | | | |
|---|---|---|---|---|
| 2004/0099468 | A1* | 5/2004 | Chernoff | B62D 1/06 180/409 |
| 2005/0121889 | A1* | 6/2005 | Enders | B60R 21/21656 280/731 |
| 2011/0167953 | A1* | 7/2011 | Jan | B62D 1/06 74/552 |
| 2015/0034622 | A1* | 2/2015 | Sasaki | H05B 3/34 219/204 |
| 2015/0151775 | A1* | 6/2015 | Yasui | B29C 45/1459 264/279 |
| 2015/0197272 | A1* | 7/2015 | Nonoyama | B62D 1/065 74/552 |
| 2018/0229752 | A1* | 8/2018 | Chascsa, II | B60K 35/00 |
| 2020/0108854 | A1* | 4/2020 | Lai | B32B 9/047 |
| 2020/0156690 | A1* | 5/2020 | Nonoyama | B62D 1/04 |
| 2022/0379832 | A1* | 12/2022 | Abe | B60R 21/21656 |

FOREIGN PATENT DOCUMENTS

| | | | | |
|---|---|---|---|---|
| CN | 110294010 | | 10/2019 | |
| EP | 0244270 | | 11/1987 | |
| EP | 3335915 | A1 * | 6/2018 | B60F 5/02 |
| FR | 3057532 | A1 | 4/2018 | |
| JP | 11-59434 | A | 3/1999 | |
| JP | 1159434 | A | 3/1999 | |
| JP | 2000043736 | | 2/2000 | |
| JP | 2003-325589 | A | 11/2003 | |
| JP | 2003325589 | | 11/2003 | |
| JP | 2005-312728 | A | 11/2005 | |
| JP | 2005312728 | | 11/2005 | |
| JP | 2009-528200 | A | 8/2009 | |
| JP | 2015-39900 | A | 3/2015 | |
| JP | 2019196098 | | 11/2019 | |

OTHER PUBLICATIONS

Japanese Patent Application No. 202080080232.6, First Office Action (8 pgs).
JP2019196098—Machine Translation (8 pgs).
CN103260995—Machine Translation (11 pgs).
JP22005312728—Machine Translation (17 pgs).
CN101374715—Machine Translation (17 pgs).
Japanese Patent Application No. 202080080232.6, First Office Action—Machine Translation (14 pgs).
CN110294010—Machine Translation (11 pgs).

* cited by examiner

STEERING WHEEL

TECHNICAL FIELD

The present technology relates to a steering wheel.

BACKGROUND TECHNOLOGY

Conventionally, a steering wheel in which a circular rim and spokes are covered with a cover has been proposed. The cover includes a plurality of cover pieces, and the plurality of cover pieces are joined by stitching. When attaching the cover to the rim, attach the cover from the outer circumference of the rim with the cover part corresponding to the inner circumference of the rim open, and stitch together the open part. By attaching the cover, the steerability can be improved (see, for example, Patent Document 1).

In recent years, steering wheels with non-circular rims have been proposed. A non-circular rim has, for example, an acutely curved portion (see, for example, Patent Document 2).

PRIOR ART DOCUMENTS

Patent Documents

[Patent Document 1] Japanese Unexamined Patent Publication No. 2015-39900
[Patent Document 2] French Patent Application Publication No. 3057532

SUMMARY OF THE INVENTION

Problem to be Solved by the Invention

When the cover is attached to a non-circular rim by the conventional method, the cover is likely to be wrinkled at the bent portion of the rim, and the cover may be loosened. When the cover moves relative to the rim during steering due to the occurrence and loosening of wrinkles, operator steering is less readily transmitted to the steering wheel.

In light of the circumstances, an object of the present disclosure is to provide a steering wheel capable of suppressing deterioration of steering ability even if a cover is attached to a non-circular portion of the steering portion.

Means for Solving the Problems

The steering wheel according to the present disclosure is a steering wheel including a boss connected to a steering shaft and a steering portion arranged around the boss, where the steering portion has a non-circular portion including a corner portion or an end portion, and the non-circular portion is covered with one or more cover pieces.

In the present disclosure, a plurality of surfaces constituting the non-circular portion are covered with one or a plurality of cover pieces to prevent wrinkles from being generated on the cover in the non-circular portion.

In the steering wheel according to the present disclosure, the one or more cover pieces cover the front surface facing the occupant in the non-circular portion, the rear surface positioned on the opposite side of the occupant, and the upper surface positioned between the front surface and the rear surface.

In the present disclosure, the front, back and top surfaces of the non-circular portion are covered with one or more cover pieces to suppress the occurrence of wrinkles.

The steering wheel according to the present disclosure includes a first cover piece that covers the front surface and the rear surface, and a second cover piece that is connected to an edge portion of the first cover piece and covers the upper surface of the steering wheel.

In the present disclosure, the front and rear surfaces are covered by the first cover piece, and the upper surface is covered by the second cover piece. The first cover piece and the second cover piece are connected to each other, which enables the cover to be attached efficiently.

In the steering wheel according to the present disclosure, the plurality of cover pieces include a first cover piece that covers the front surface and the rear surface, and a second cover piece that covers the upper surface.

In the present disclosure, the front and rear surfaces are covered by the first cover piece, and the upper surface is covered by the second cover piece. The first cover piece and the second cover piece are separated, and it is easy to suppress the occurrence of wrinkles.

In the steering wheel according to the present disclosure, at least one of the first cover piece or the second cover piece is divided into a plurality of cover portions.

In the present disclosure, at least one of the first cover piece and the second cover piece is further divided, and the generation of wrinkles is further suppressed.

In the steering wheel according to the present disclosure, the steering portion includes a rim arranged around the boss and spokes protruding from the rim toward the boss, where the first cover piece covers the front surface facing the occupant and the rear surface positioned on the opposite side of the occupant, and the second cover piece is arranged on both the front surface and the rear surface and covers the end surfaces of the rim extending from the front surface to the rear surface, and the surface of the spokes arranged between the front surface and rear surface that extend from the end surface of the rim to the boss.

In the present disclosure, the first cover piece covers the front and rear surfaces of the rim and spokes, and the second cover piece covers the end surface of the rim and the surface of the spokes between the end surface of the rim and the boss. Since the front and rear surfaces and the end surface and the top surface are covered with different cover pieces, wrinkles are less likely to occur on the cover at the connecting portion between the rim and the spokes.

The steering wheel according to the present disclosure is characterized in that the rim and spokes are connected in an L-shape or a T-shape.

In the present disclosure, the rims and spokes are connected in an L-shape or a T-shape, so that the operator can easily operate the steering wheel.

The steering wheel according to the present disclosure is characterized in that the outer edge of the portion of the second cover piece corresponding to the end surface of the rim is formed in a curved shape.

In the present disclosure, the shape of the second cover piece corresponds to the shape of the end surface of the rim, the second cover piece is connected to the first cover piece without play, and wrinkles are less likely to occur. Moreover, the design is not impaired.

In the steering wheel according to the present disclosure, the second cover piece has a rectangular strip shape.

In the present disclosure, the second cover piece covers the surface of the steering portion having a quadrangular shape.

In the steering wheel according to the present disclosure, the steering portion includes a rim arranged around the boss, and the cover piece covers an end portion of a discontinuity point in the circumferential direction of the outer diameter of the rim.

In the present disclosure, the cover piece covers the end of a discontinuous rim, for example, an arc-shaped rim that is cut off from a portion of the ring. Therefore, it is easy to suppress wrinkles from being generated on the cover at the end of the rim.

In the steering wheel according to the present disclosure, the edge portions of the cover pieces are joined by stitching.

In the present disclosure, the plurality of cover pieces are joined by stitching and are not easily peeled off from the rim and spokes.

The steering wheel according to the present disclosure is characterized in that the cover piece is made of leather or cloth.

In the present disclosure, the leather cover is not slippery and can improve the design. The cloth cover is easy to color, and the design of the cover variation can be easily manufactured.

Effect of the Invention

In the steering wheel according to the present disclosure, since the plurality of surfaces constituting the non-circular portion are covered with different cover pieces, wrinkles are less likely to occur on the cover in the non-circular portion, and the cover is less likely to loosen.

MODE FOR CARRYING OUT THE INVENTION

Embodiment 1

Figure 1:
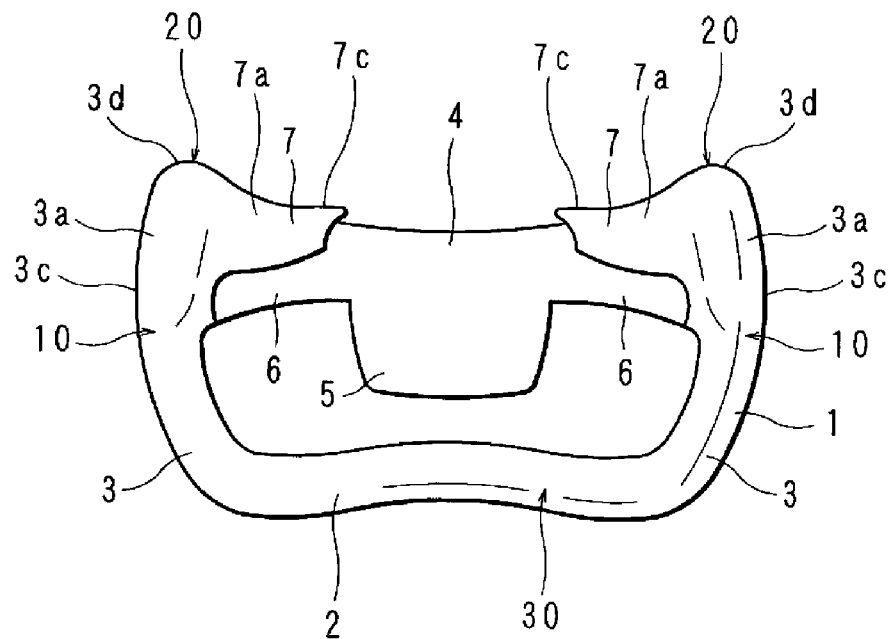
FIG. 1 is a front view illustrating a boss, a rim, and spokes according to Embodiment 1.
Figure 2:
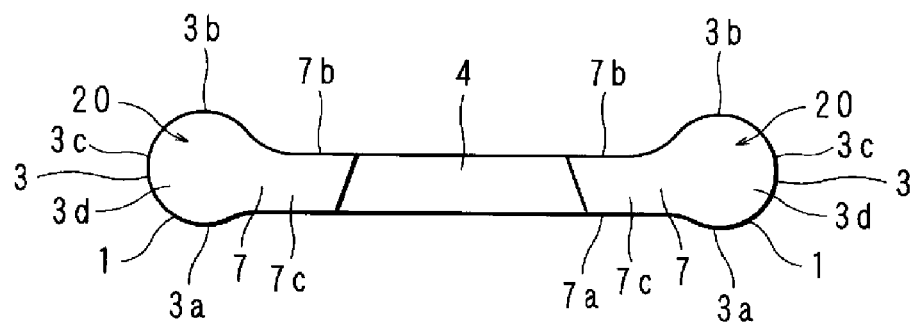
FIG. 2 is a top view illustrating a boss, a rim, and spokes.

Hereinafter, the present invention will be described with reference to the drawings illustrating the steering wheel according to the Embodiment. FIG. 1 is a front view illustrating a boss 4, a rim 1, and spokes 7. FIG. 2 is a plan view illustrating the boss 4, the rim 1, and the spokes 7. In the following description, the front surface indicates the surface facing the occupant, and the rear surface indicates the surface positioned on the side opposite the occupant.

Figure 4:
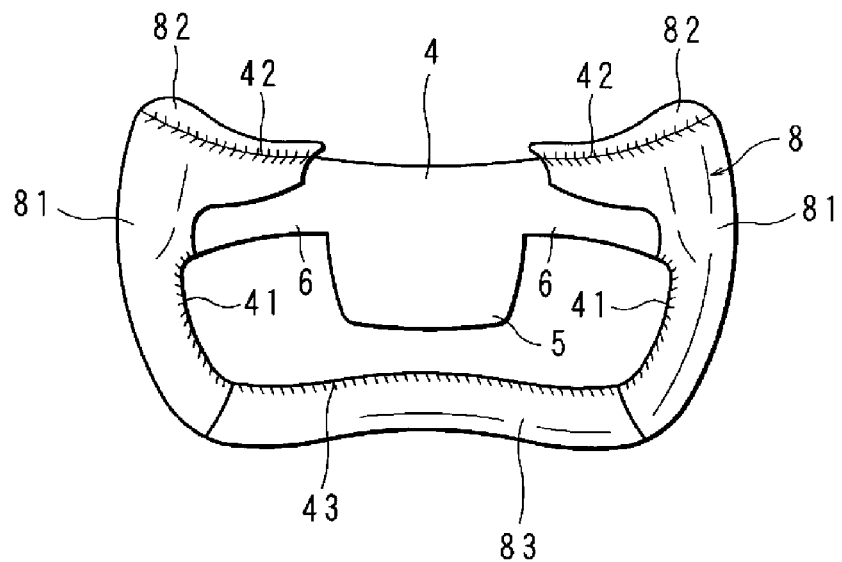
FIG. 4 is a front view illustrating a steering wheel to which a cover is attached.

The steering wheel includes the boss 4, rim 1, spokes 7 and cover 8 (see FIG. 4). The rim 1 and spokes 7 correspond to the steering portion. The boss 4 is connected to a steering shaft (not illustrated). As illustrated in FIG. 1, the boss 4 includes a block-shaped center portion 5 attached to the steering shaft, and protruding parts 6 protruding from both side surfaces of the center portion 5. The protruding parts 6 protrude outward in the radial direction of the steering shaft.

The rim 1 has a U-shape in front view and surrounds the boss 4. The spokes 7 are connected to both ends of the rim 1. The spokes 7 protrude from both ends of the rim 1 toward the boss 4, and are connected to the center portion 5 of the boss 4 via the protruding parts 6. The connecting portion of the rim 1 and the spokes 7 is L-shaped in front view, and the internal angle of the rim 1 and the spokes 7 is an acute angle. The protruding parts 6 of the boss 4 are attached to a part of the front surface 7a of the spokes 7. The protruding parts 6 may be removed, and the spokes 7 and the boss 4 may be directly connected.

As illustrated in FIG. 1 and FIG. 2, the rim 1 and spokes 7 include a first region 10, a second region 20, and a third region 30. The U-shaped rim 1 includes a bottom portion 2 and two protruding parts 3 protruding from both sides of the bottom portion 2. The surface of the bottom portion 2 forms the third region 30. The front surface 3a, rear surface 3b, and side surface 3c of the protruding parts 3 of the rim 1 and the front surface 7a and rear surface 7b of the spokes 7 form the first region 10. The end surface 3d of the rib and the surface of the spokes 7 (hereinafter referred to as the upper surface 7c) positioned between the end surface 3d and the boss 4 form the second region 20. The upper surface 7c of the spokes 7 is positioned between the front surface 7a and the rear surface 7b and is connected to the end surface 3d of the rib. The end surface 3d of the rib has a circular shape when viewed from above.

Figure 3:
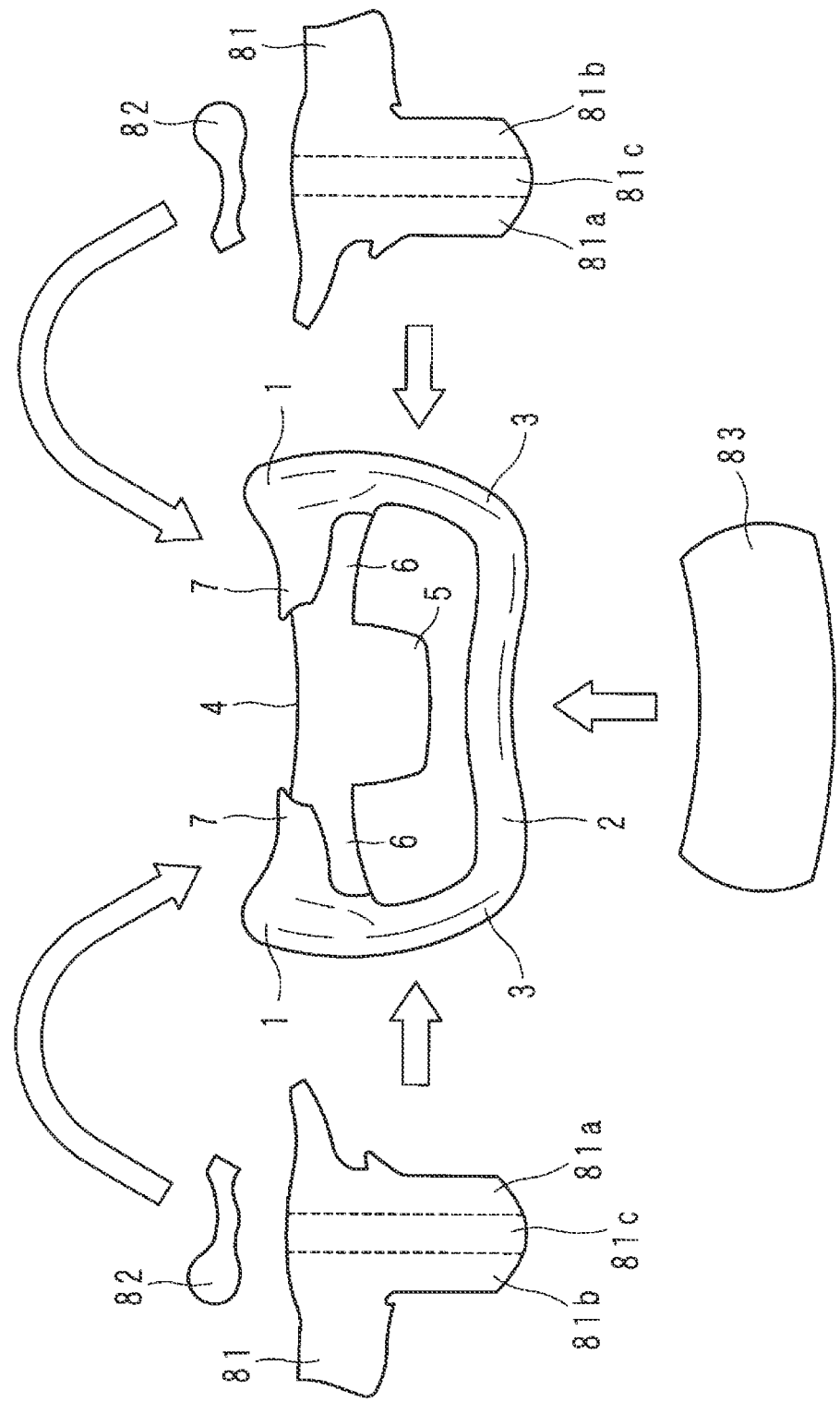
FIG. 3 is an explanatory diagram illustrating attachment of a cover to a rim and spokes.

FIG. 3 is an explanatory diagram illustrating the attachment of the cover 8 to the rim 1 and the spokes 7. FIG. 4 is a front view illustrating the steering wheel to which the cover 8 is attached. The cover 8 is made of leather and includes two first cover pieces 81, two second cover pieces 82, and one third cover piece 83. Note that the cover 8 may be made of cloth.

The first cover piece 81 has a sheet shape and corresponds to the shapes of the front surface 3a, rear surface 3b and side surface 3c of the protruding parts 3 of the rim 1 and the shapes of the front surface 7a and the rear surface 7b of the spokes 7. The first cover piece 81 includes a front surface portion 81a, a side surface portion 81c, and a rear surface portion 81b. A front surface portion 81a and a rear surface portion 81b are connected to both sides of the side surface portion 81c, respectively. In FIG. 3, the broken line of the first cover piece 81 indicates the boundary between the front surface portion 81a and the side surface portion 81c and the boundary between the rear surface portion 81b and the side surface portion 81c. The front surface portion 81a is attached to the front surfaces 3a and 7a of the first region 10, the side surface portion 81c is attached to the side surface 3c of the first region 10, and the rear surface portion 81b is attached to the rear surfaces 3b and 7b of the first region 10.

Note, the front surface side portion of the side surface portion 81c may be a portion of the front surface portion 81a, and the rear surface side portion of the side surface portion 81c may be a portion of the rear surface portion 81b. In this case, for example, the boundary between the front surface portion 81a and the rear surface portion 81b is positioned at the center of the side surface portion 81c.

As illustrated in FIG. 4, the first cover piece 81 covers the first region 10 from the outer peripheral side of the rim 1, and the two edges of the first cover piece 81 are joined by stitching on the inner peripheral side of the rim 1, where a seam 41 is formed.

The second cover piece 82 has a sheet shape and corresponds to the shape of the end surface 3d of the rib and the shape of the upper surface 7c of the spokes 7. The portion of the second cover piece 82 attached to the end surface 3d has a circular shape and corresponds to the shape of the end surface 3d. As illustrated in FIG. 4, the second cover piece 82 is attached to the second region 20, and the edge portion of the second cover piece 82 and the edge portion of the first cover piece 81 are joined by stitching to form a seam 42.

The third cover piece 83 has a sheet shape and corresponds to the shape of the bottom portion 2. As illustrated in FIG. 4, the third cover piece 83 covers the third region 30 from the outer peripheral side of the rim 1, and the two edges of the third cover piece 83 are joined by stitching on the inner peripheral side of the rim 1, where a seam 43 is formed. As described above, the steering wheel is manufactured by attaching the cover 8 to the rim 1 and the spokes 7.

In the steering wheel according to Embodiment 1, the end portion of the rim 1 and the front surfaces 3a and 7a and the rear surfaces 3b and 7b of the spokes 7 are covered by the first cover piece 81, and the end surface 3d of the rim 1 and upper surface 7c of the spokes 7 are covered by the second cover piece 82. Since the front surfaces 3a and 7a and the rear surfaces 3b and 7b are covered with different cover pieces than the end surface 3d and the upper surface 7c, wrinkles are less readily to occur in the cover 8 at the connecting portion (corner portion) between the rim 1 and the spokes 7, and the cover 8 does not readily loosen.

The first cover piece 81 and the second cover piece 82 are joined by stitching and are not easily peeled off from the rim 1 and the spokes 7.

Further, the rim 1 and the spokes 7 are connected in an L shape, so that the operator can easily operate the steering wheel. Since the rim 1 and the spokes 7 are connected at an acute angle, the operator can easily grasp the vicinity of the corner of the steering wheel and easily transmit force to the steering wheel.

Further, the shape of the second cover piece 82 corresponds to the shape of the end surface 3d of the rim 1, the second cover piece 82 is connected to the first cover piece 81 with no play, and wrinkles are less likely to occur. Moreover, the design is not impaired.

Further, the leather cover 8 is not slippery and can improve the design. A cloth cover 8 can also be used. The cloth cover 8 is easily colored, and a variation of the cover 8 can be easily manufactured.

In Embodiment 1, the two spokes 7 protrude from the two ends of the rim 1, but the two ends of the rim 1 can be connected by one spoke 7 curved so as to protrude toward the boss 4. In this case, the rim 1 and the spokes 7 have a crescent shape, for example, and the center portion of the spokes 7 is connected to the boss 4.

The first cover piece 81 and the second cover piece 82 may be configured as follows. The first cover piece 81 may correspond to the shapes of the front surface 3a and the side surface 3c of the protruding parts 3 and the shape of the front surface 7a of the spokes 7, and the second cover piece 82 may correspond to the shapes of the rear surface 3b of the protruding parts 3, the rear surface 7b of the spokes 7, the end surface 3d of the rib, and the upper surface 7c of the spokes 7.

Furthermore, the first cover piece 81 may correspond to the shape of the side surface 3c of the first cover piece 81, and the second cover piece 82 may correspond to the shapes of the front surface 3a, the end surface 3d and the rear surface 3b of the protruding part 3, and the front surface 7a, the upper surface 7c, and the rear surface 7b of the spokes 7.

That is to say, that the steering wheel may be configured such that one of the first cover piece 81 and the second cover piece 82 covers one to three of the four surfaces including the front surface, the rear surface, the upper surface, and the side surface of the protruding part 3 and the entirety of the spokes 7, with the remainder being covered by the other of the first cover piece 81 and second cover piece 82.

Figure 5:
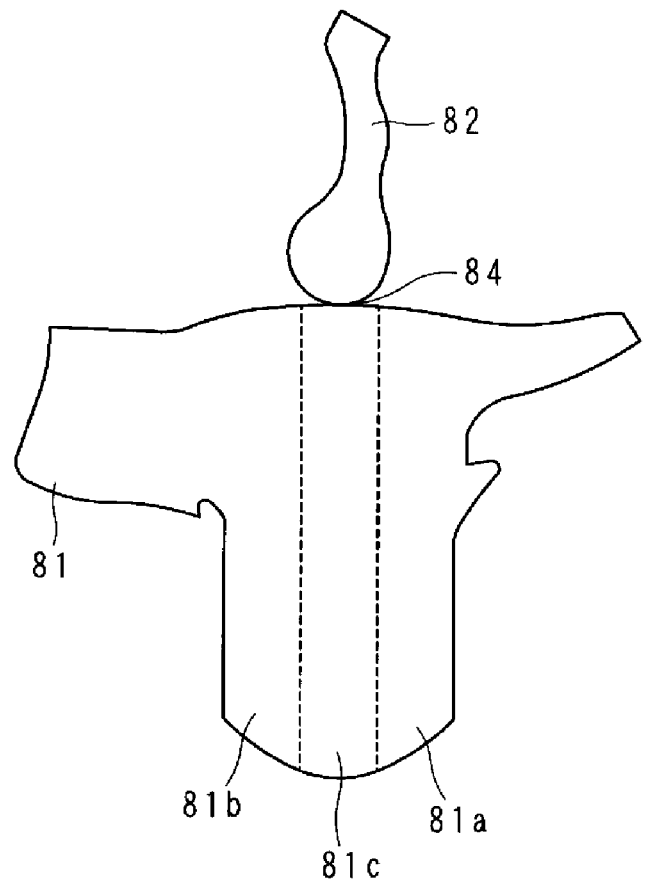
FIG. 5 is a development view illustrating a modified example of the first cover piece and the second cover piece whose configuration is partially modified.
Figure 6:
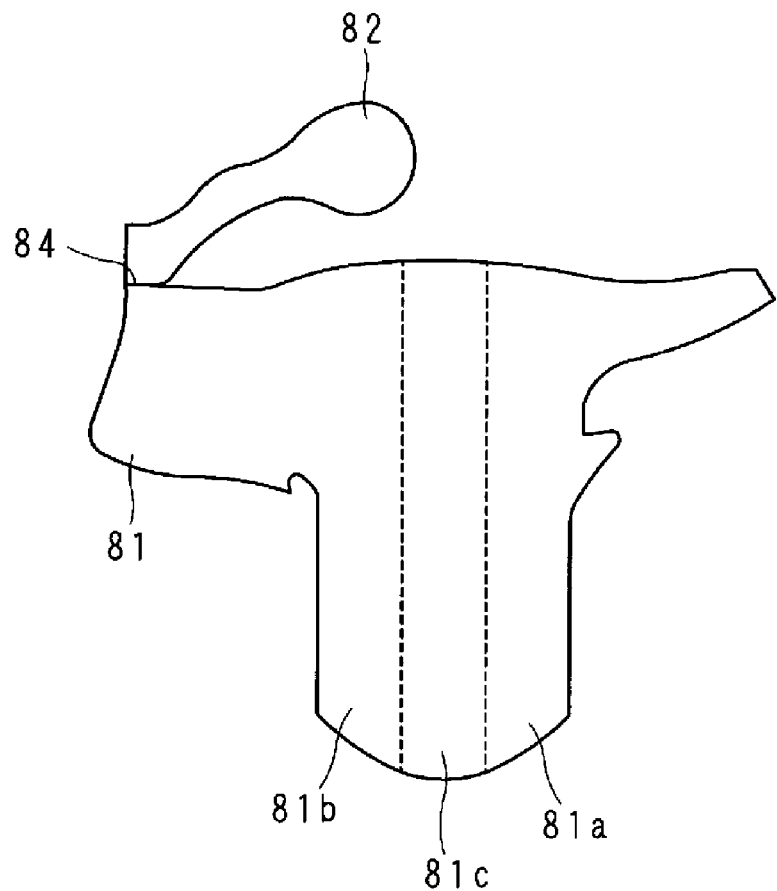
FIG. 6 is a development view illustrating a modified example of the first cover piece and the second cover piece whose configuration is partially modified.

FIG. 5 and FIG. 6 are development views illustrating modified examples of the first cover piece 81 and the second cover piece 82 whose configurations are partially modified. As illustrated in FIG. 5, the side surface portion 81c of the first cover piece 81 and the second cover piece 82 may be connected via the connecting portion 84. Further, as illustrated in FIG. 6, the rear surface portion 81b of the first cover piece 81 and the second cover piece 82 may be connected via the connecting portion 84.

When the first cover piece 81 and the second cover piece 82 are connected, for example, the operator folds the connecting portion 84 inward and attaches the edge portions of the first cover piece 81 and the second cover piece 82, respectively, by stitching, covering the rim 1 and the spokes 7.

Figure 7:
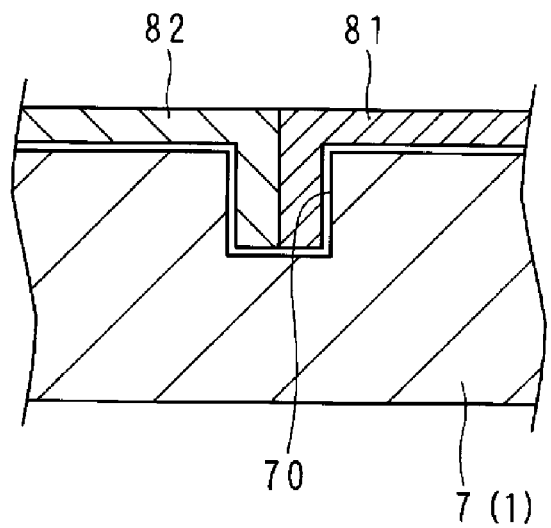
FIG. 7 is a partially enlarged cross-sectional view illustrating a modified example of a steering wheel whose configuration has been partially modified.

FIG. 7 is a partially enlarged cross-sectional view illustrating a modified example of the steering wheel whose configuration is partially modified. As described below, instead of stitching, an adhesive may be used to join the first cover piece 81 and the second cover piece 82. As illustrated in FIG. 7, a groove 70 is formed in the spokes 7 and the rim 1. The position of the groove 70 corresponds to the position of the edge portion of each of the first cover piece 81 and the second cover piece 82. For example, the operator may insert the edge portions of the first cover piece 81 and the second cover piece 82 into the groove 70, and secure each edge portion to the groove 70 using an adhesive.

Embodiment 2

Figure 8:
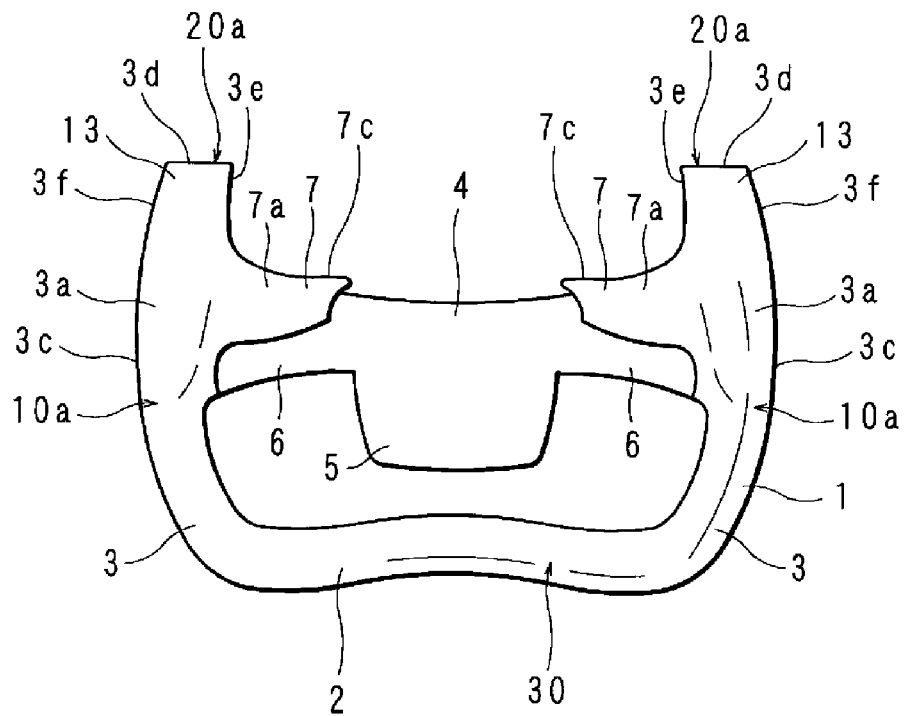
FIG. 8 is a front view illustrating a boss, a rim, and spokes according to Embodiment 2.

Hereinafter, the present invention will be described with reference to the drawings illustrating the steering wheel according to Embodiment 2. Of the configurations according to Embodiment 2, the same configurations as those of Embodiment 1 are designated by the same codes, and detailed descriptions thereof are omitted. FIG. 8 is a front view illustrating the boss 4, the rim 1, and the spokes 7.

As illustrated in FIG. 8, an end portion 13 protrudes from each protruding part 3 above the upper surface 7*c*. The upper end surface of the end portion 13 forms the end surface 3*d*. On the opposite side of the side surface 3*c*, the end portion 13 comprises a first side surface 3*e*. The first side surface 3*e* is connected to the end surface 3*d* and the upper surface 7*c*. On the opposite side of the first side surface 3*e*, the end portion 13 comprises a second side surface 3*f*. The second side surface 3*f* is connected to the end surface 3*d* and the side surface 3*c*. The first side surface 3*e* and the second side surface 3*f* are positioned between the front surface 3*a* and the rear surface 3*b*.

The front surface 3*a*, rear surface 3*b*, and side surface 3*c* of the protruding parts 3, the front surface, rear surface and second side surface 3*f* of the end portion 13, and the front surface 7*a* and rear surface 7*b* of the spokes 7 form a first region 10*a*. The end surface 3*d*, the upper surface 7*c*, and the first side surface 3*e* form a second region 20*a*. From a front view, the position of the end surface 3*d* in the circumferential direction of the rim 1 corresponds to the discontinuity point.

Figure 9:
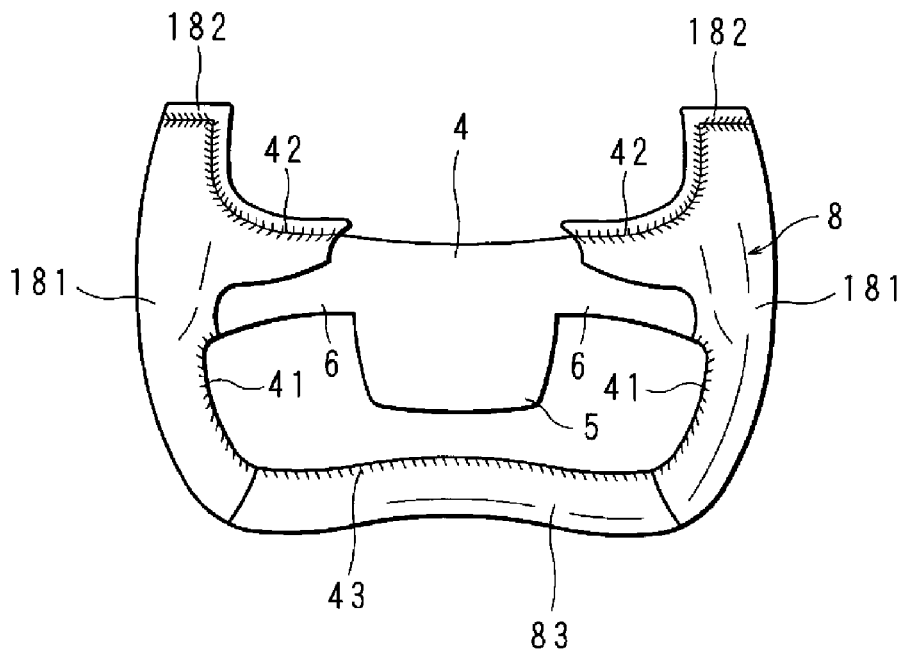
FIG. 9 is a front view illustrating a steering wheel to which a cover is attached.

FIG. 9 is a front view illustrating the steering wheel to which the cover 8 is attached. A first cover piece 181 has a sheet shape, and corresponds to the shapes of the front surface 3*a*, rear surface 3*b*, and side surface 3*c* of the protruding part 3, the front surface, rear surface, and second side surface 3*f* of the end portion 13, and the front surface 7*a* and rear surface 7*b* of the spokes 7. The second cover piece 182 has a sheet shape and corresponds to the shape of the end surface 3*d*, the shape of the first side surface 3*e*, and the shape of the upper surface 7*c* of the spokes 7. As illustrated in FIG. 9, the first cover piece 181 covers the first region 10*a*, and the second cover piece 182 covers the second region 20*a*. The edge portion of the second cover piece 182 and the edge portion of the first cover piece 181 are joined by stitching to form the seam 42.

Since the first region 10*a* and the second region 20*a* are covered with different cover pieces, wrinkles are less likely to occur on the cover 8 at the connecting portion (corner portion) and the end portion 13 between the rim 1 and the spokes 7, and this decreases the likelihood of the cover 8 loosening.

Embodiment 3

Figure 10:
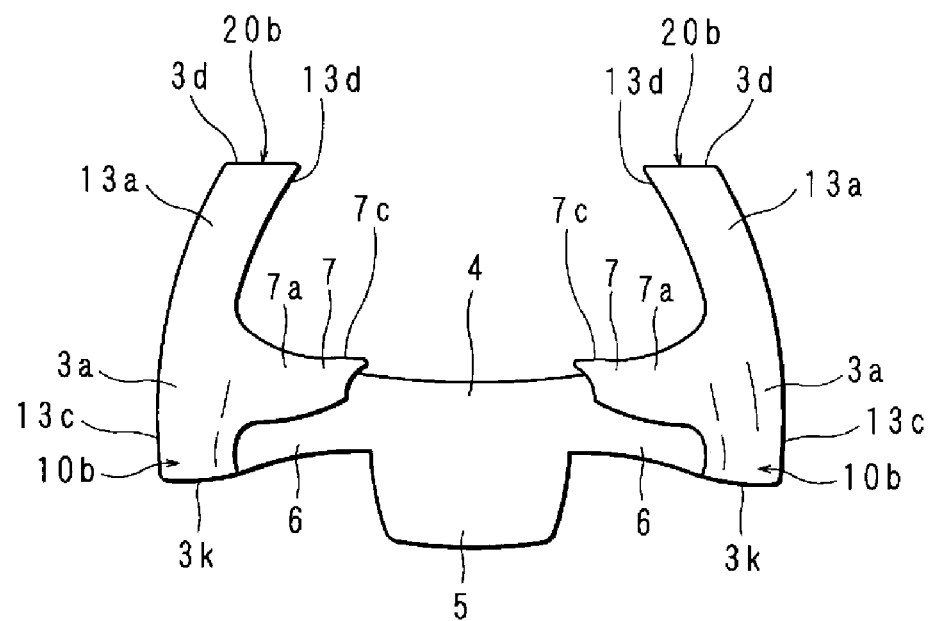
FIG. 10 is a front view illustrating a boss, a rim, and spokes according to Embodiment 3.

Hereinafter, the present invention will be described with reference to the drawings illustrating the steering wheel according to Embodiment 3. Of the configurations according to Embodiment 3, the same configurations as those of Embodiment 1 or 2 are designated by the same codes, and detailed descriptions thereof are omitted. FIG. 10 is a front view illustrating the boss 4, the rim 1, and the spokes 7. In Embodiment 3, the rim 1 does not have a bottom portion 2, unlike Embodiments 1 and 2. The rim 1 includes an arc-shaped rim portion 3*k* arranged along the periphery of the boss 4. The rim portion 3*k* includes a front surface 3*a*, a rear surface 3*b*, an outer peripheral surface 13*c*, an inner peripheral surface 13*d*, and an end surface 3*d*. The spokes 7 protrude from the middle portion of the inner peripheral surface 13*d*. A portion of the rim portion 3*k* protruding above the upper surface 7*c* forms an end portion 13*a*. The upper end surface of the end portion 13*a* forms the end surface 3*d*.

The front surface 3*a*, rear surface 3*b*, outer peripheral surface 13*c*, front surface 7*a*, and rear surface 7*b* of the spokes 7 form a first region 10*b*. The end surface 3*d*, the upper surface 7*c*, and the inner peripheral surface 13*d* above the upper surface 7*c* form a second region 20*b*.

Figure 11:
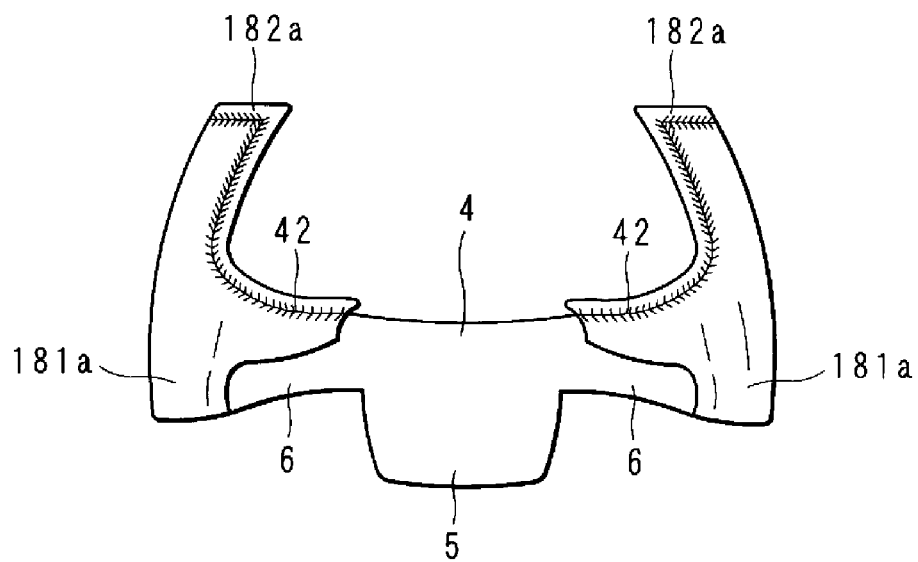
FIG. 11 is a front view illustrating a steering wheel to which a cover is attached.

FIG. 11 is a front view illustrating the steering wheel to which the cover 8 is attached. The first cover piece 181*a* has a sheet shape and corresponds to the shapes of the front surface 3*a*, rear surface 3*b*, and outer peripheral surface 13*c*, and the front surface 7*a* and rear surface 7*b* of the spokes 7. The second cover piece 182*a* has a sheet shape and corresponds to the shape of the end surface 3*d*, the upper surface 7*c*, and the inner peripheral surface 13*d* above the upper surface 7*c*. As illustrated in FIG. 11, the first cover piece 181*a* covers the first region 10*b*, and the second cover piece 182*a* covers the second region 20*b*. The edge portion of the second cover piece 182*a* and the edge portion of the first cover piece 181*ab* are joined by stitching to form the seam 42.

Since the first region 10*b* and the second region 20*b* are covered with different cover pieces, wrinkles are less likely to occur on the cover 8 at the connecting portion (corner portion) and at the end portion 13*a* between the rim portion 3*k* and the spokes 7, and this decreases the likelihood of the cover 8 loosening.

Embodiment 4

Figure 12:
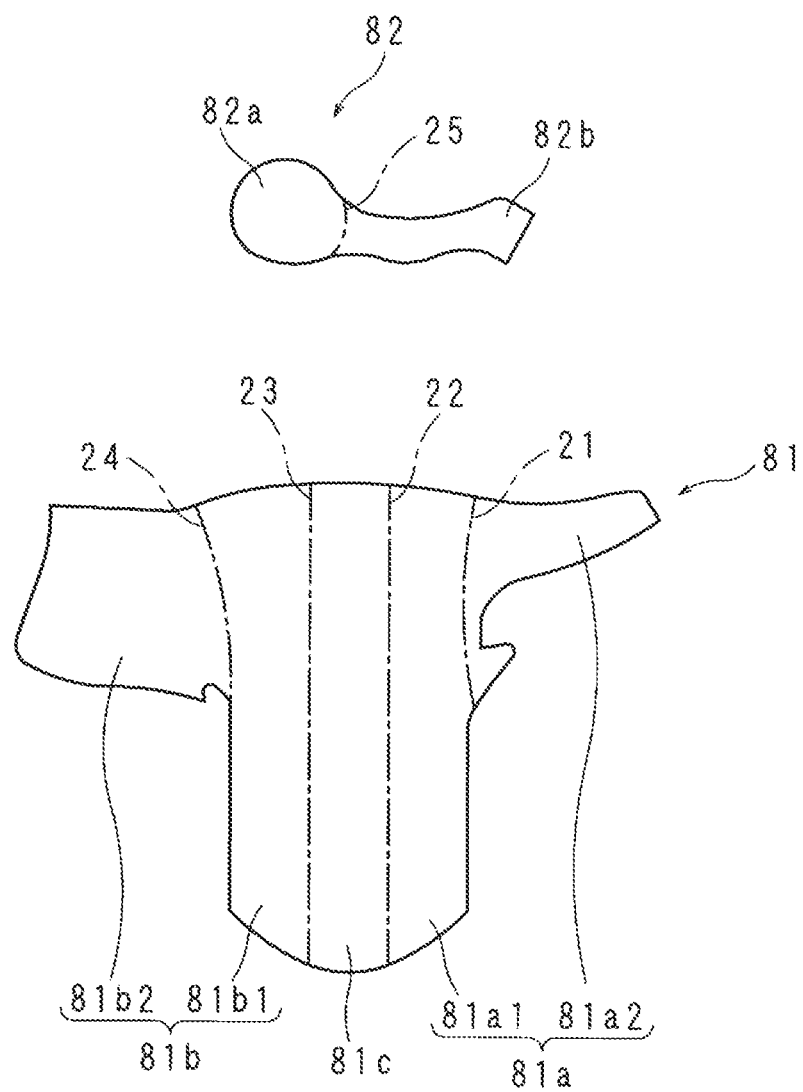
FIG. 12 is a front view illustrating a first cover piece and a second cover piece according to Embodiment 4.

Hereinafter, the present invention will be described with reference to the drawings illustrating the steering wheel according to Embodiment 4. Of the configurations according to Embodiment 4, the same configurations as those of embodiments 1 to 3 are designated by the same reference numerals, and detailed description thereof will be omitted. In Embodiment 4, the cover 8 includes the separated first cover piece 81 and the second cover piece 82 as in Embodiment 1. FIG. 12 is a front view illustrating the first cover piece 81 and the second cover piece 82. FIG. 12 corresponds to the first cover piece 81 and the second cover piece 82 arranged on the left side of FIG. 3.

As illustrated in FIG. 12, the first cover piece 81 may be divided by at least one dividing line among a first dividing line 21, a second dividing line 22, a third dividing line 23, and a fourth dividing line 24. Further, the second cover piece 82 may be divided by a fifth dividing line 25.

The first dividing line 21 is formed in the region of the front surface portion 81*a*. As described above, the front surface portion 81*a* corresponds to the front surface 3*a* of the protruding parts 3 and the front surface 7*a* of the spokes 7. The first dividing line 21 is positioned at the boundary between the portion 81*a*1 corresponding to the front surface 3*a* and the portion 81*a*2 corresponding to the front surface 7*a* in the front surface portion 81*a*.

The second dividing line 22 is positioned at the boundary between the front surface portion 81*a* and the side surface portion 81*c*. The third dividing line 23 is positioned at the boundary between the side surface portion 81*c* and the rear surface portion 81*b*.

The fourth dividing line 24 is formed in the region of the rear surface portion 81*b*. As described above, the rear surface portion 81*b* corresponds to the rear surface 3*b* of the protruding parts 3 and the rear surface 7*b* of the spokes 7. The fourth dividing line 24 is positioned at the boundary between the portion 81*b*1 corresponding to the rear surface 3*b* and the portion 81*b*2 corresponding to the rear surface 7*b* in the rear surface portion 81*b*.

As described above, the second cover piece 82 corresponds to the end surface 3*d* of the rib and the upper surface 7*c* of the spokes 7. The fifth dividing line 25 is positioned at the boundary between the portion 82*a* corresponding to the end surface 3d and the portion 82b corresponding to the upper surface 7c in the second cover piece 82.

In Embodiment 4, the first cover piece 81 and the second cover piece 82 may be divided by at least one of the first dividing line 21 to fifth dividing line 25, and may be divided into 3 to 7 cover portions. Adjacent cover portions are connected to each other by stitching or adhesion. By further dividing the first cover piece 81 or the second cover piece 82, the generation of wrinkles is further suppressed.

Embodiment 5

Figure 13:
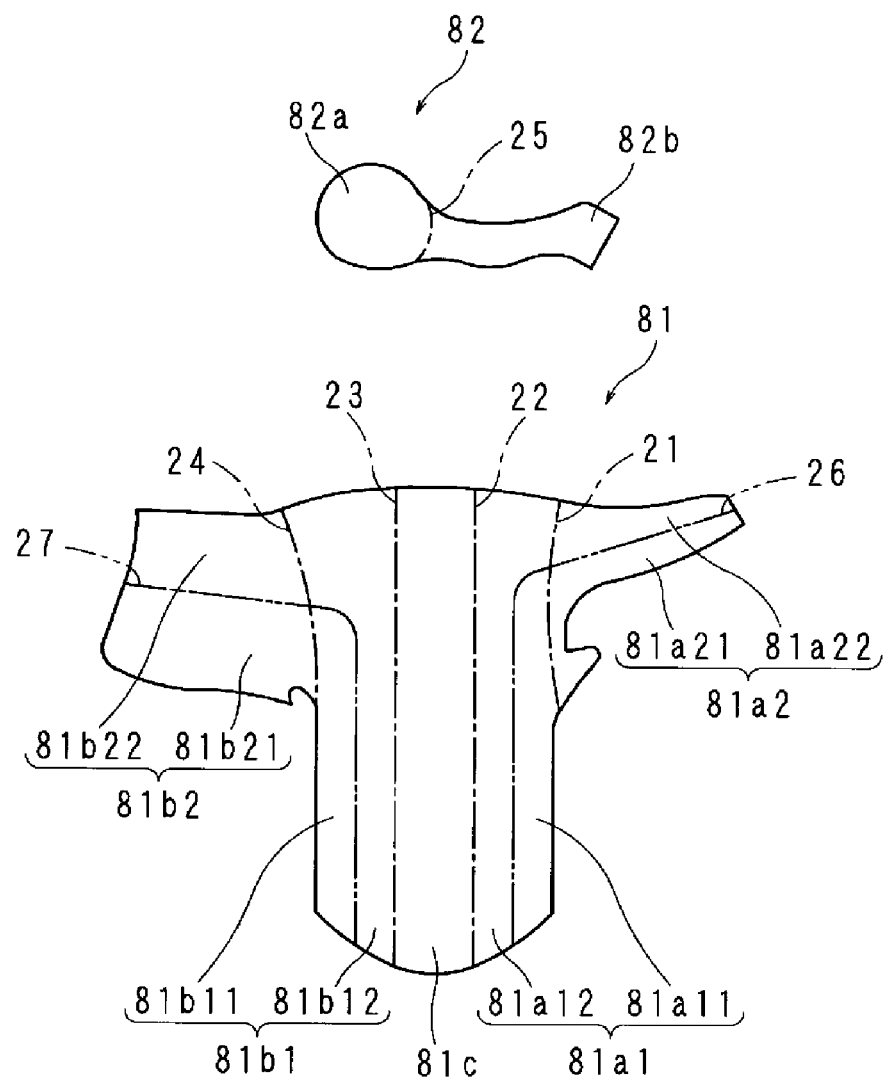
FIG. 13 is a front view illustrating a first cover piece and a second cover piece according to Embodiment 5.

Hereinafter, the present invention will be described with reference to the drawings illustrating the steering wheel according to Embodiment 5. Of the configurations according to Embodiment 5, the same configurations as those of Embodiment 1 to 4 are designated by the same codes, and detailed descriptions thereof are omitted. In Embodiment 5, similar to Embodiment 4, the cover 8 includes the separated first cover piece 81 and the second cover piece 82, and may be divided by the first dividing line 21 to fifth dividing line FIG. 13 is a front view illustrating the first cover piece 81 and the second cover piece 82.

The first cover piece 81 may be divided by the sixth dividing line 26 or seventh dividing line 27. As illustrated in FIG. 13, the sixth dividing line 26 is formed in the region of the portion 81a1 corresponding to the front surface 3a and the portion 81a2 corresponding to the front surface 7a. In the following description, the center portion 5 side is referred to as the inside, and the side opposite the center portion 5 is referred to as the outside (see FIG. 1). The sixth dividing line 26 is positioned at the boundary between the portion 81a11 corresponding to the inner portion of the front surface 3a in the portion 81a1 and the portion 81a12 corresponding to the outer portion of the front surface 3a, and is further positioned at the boundary between the portion 81a21 corresponding to the inner portion of the front surface 7a in the portion 81a2 and the portion 81a22 corresponding to the outer portion of the front surface 7a.

The seventh dividing line 27 is positioned at the boundary between the portion 81b11 corresponding to the inner portion of the rear surface 3b in the portion 81b1 and the portion 81b12 corresponding to the outer portion of the rear surface 3b, and is further positioned at the boundary between the portion 81b21 corresponding to the inner portion of the rear surface 7b in the portion 81b2 and the portion 81b22 corresponding to the outer portion of the rear surface 7b.

In Embodiment 5, the first cover piece 81 and the second cover piece 82 are divided by at least one of the first dividing line 21 to seventh dividing line 27, and can be divided into 3 to 11 cover portions. Adjacent cover portions are connected to each other by stitching or adhesion.

Embodiment 6

Figure 14:
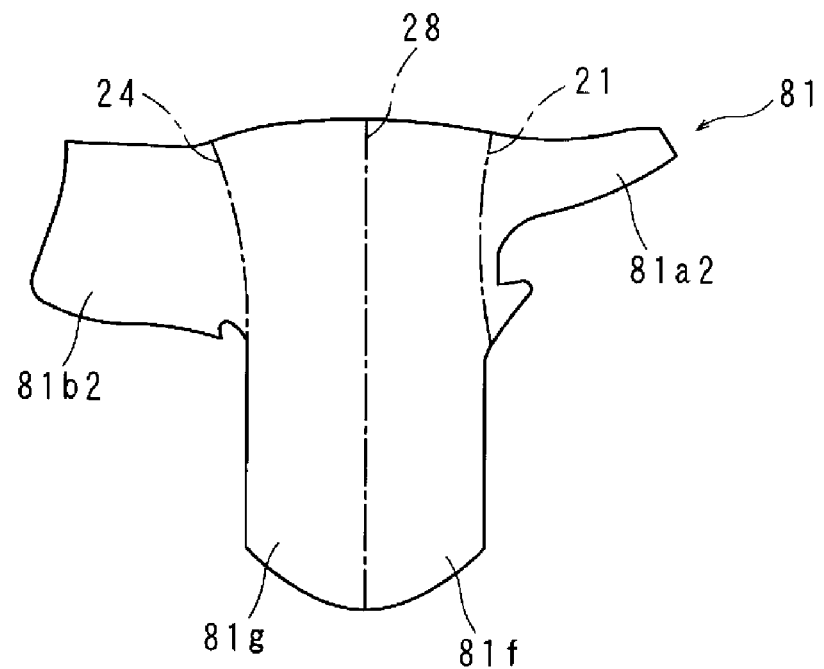
FIG. 14 is a front view illustrating a first cover piece and a second cover piece according to Embodiment 6.

Hereinafter, the present invention will be described with reference to the drawings illustrating the steering wheel according to Embodiment 6. Of the configurations according to Embodiment 6, the same configurations as those of Embodiments 1 to 5 are designated by the same reference numerals, and detailed description thereof will be omitted. In Embodiment 6, as in Embodiment 4, the cover 8 includes the separated first cover piece 81 and the second cover piece 82, and can be divided by the first dividing line 21, fourth dividing line 24, or fifth dividing line 25. FIG. 14 is a front view illustrating the first cover piece 81 and the second cover piece 82.

The first cover piece 81 may be divided by the eight dividing line 28. As illustrated in FIG. 14, the eight dividing line 28 is positioned at the center of the side surface 3c of the protruding part 3. The portion 81f between the first dividing line 21 and the eight dividing line 28 in the first cover piece 81 corresponds to the front surface side portion of the front surface 3a and the side surface 3c of the protruding part. The portion 81g between the fourth dividing line 24 and the eight dividing line 28 in the first cover piece 81 corresponds to the rear surface side portion of the rear surface 3b and the side surface 3c of the protruding part.

Since the front surface side portion of the side surface 3c can be regarded as a part of the front surface 3a and the rear surface side portion of the side surface 3c can be regarded as a part of the rear surface 3b, the portion 81f corresponds to the front surface of the protruding part 3 and the portion 81g corresponds to the rear surface of the protruding part 3.

In Embodiment 6, the first cover piece 81 and the second cover piece 82 are separated by at least one of the first dividing line 21, fourth dividing line 24, fifth dividing line 25, and eight dividing line 28, and can be divided into 3 to 6 cover portions. Adjacent cover portions are connected to each other by stitching or adhesion.

Embodiment 7

Figure 15:
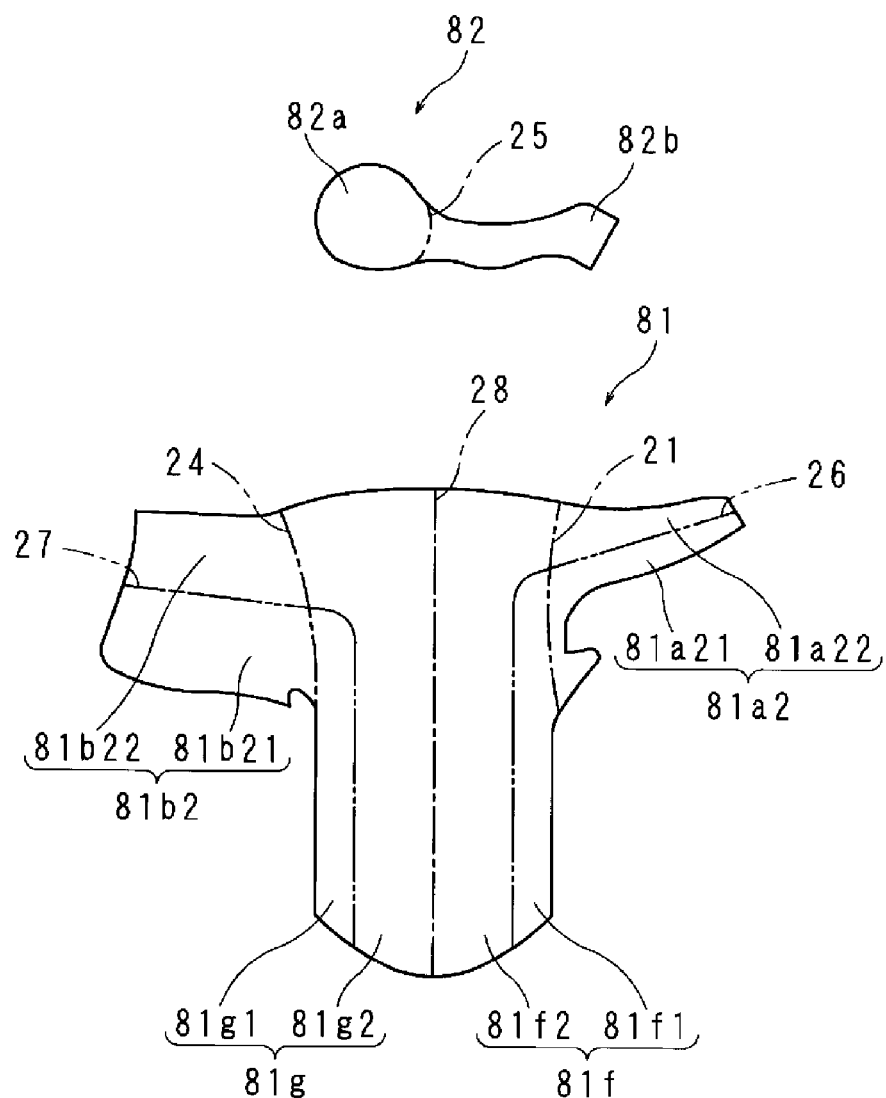
FIG. 15 is a front view illustrating a first cover piece and a second cover piece according to Embodiment 7.

Hereinafter, the present invention will be described with reference to the drawings illustrating the steering wheel according to Embodiment 7. Of the configurations according to Embodiment 7, the same configurations as those of Embodiments 1 to 6 are designated by the same reference numerals, and detailed description thereof will be omitted. In Embodiment 7, the cover 8 includes the separated first cover piece 81 and the second cover piece 82 as in Embodiment 6, and is divided by the first dividing line 21, fourth dividing line 24, fifth dividing line 25, or eight dividing line 28. FIG. 15 is a front view illustrating the first cover piece 81 and the second cover piece 82.

The first cover piece 81 may be divided by the sixth dividing line 26 or seventh dividing line 27, as in Embodiment 5. As illustrated in FIG. 15, the sixth dividing line 26 is positioned at the boundary between the portion 81a21 and the portion 81a22, and is further positioned at the boundary between the inner portion 81f1 of the portion 81f and the outer portion 81f2 of the portion 81f. The seventh dividing line 27 is positioned at the boundary between the portion 81b21 and the portion 81b22, and is further positioned at the boundary between the inner portion 81g1 of the portion 81g and the outer portion 81g2 of the portion 81g.

The sixth dividing line 26 is only an example of a line that divides the portion 81a2 and the portion 81f, and a line that divides the portion 81a2 and the portion 81f is not limited to the sixth dividing line 26. Further, the seventh dividing line 27 is only an example of a line that divides the portion 81b2 and the portion 81g, and a line that divides the portion 81b2 and the portion 81g is not limited to the seventh dividing line 27.

In Embodiment 7, the first cover piece 81 and the second cover piece 82 are divided by at least one of the first dividing line 21 and fourth dividing line 24 to eight dividing line 28, and can be divided into 3 to 10 cover portions. Adjacent cover portions are connected to each other by stitching or adhesion.

Embodiment 8

Figure 16:
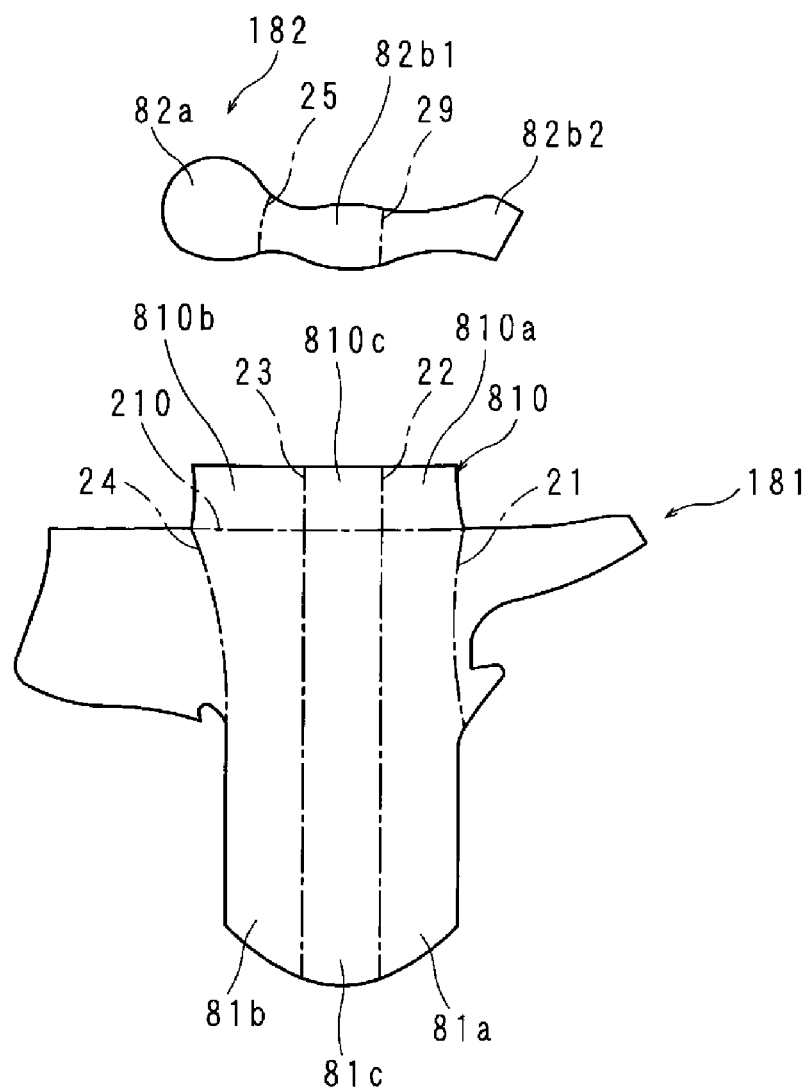
FIG. 16 is a front view illustrating a first cover piece and a second cover piece according to Embodiment 8.

Hereinafter, the present invention will be described with reference to the drawings illustrating the steering wheel according to Embodiment 8. Of the configurations according to Embodiment 8, the same configurations as those of Embodiments 1 to 7 are designated by the same reference numerals, and a detailed description thereof will be omitted. In Embodiment 8, the cover 8 includes the separated first cover piece 181 and the second cover piece 182, and is divided by the first dividing line 21 to fifth dividing line 25, as in Embodiment 4. FIG. 16 is a front view illustrating the first cover piece 181 and the second cover piece 182.

The cover 8 covers the boss 4, the rim 1, and the spokes 7 (see FIG. 8) of Embodiment 2. Therefore, the cover 8 includes a cover piece 810 that covers the end portion 13 protruding upward from the protruding part 3.

As illustrated in FIG. 16, the cover piece 810 is arranged above the front surface portion 81a, the rear surface portion 81b, and the side surface portion 81c. The cover 8 may be divided by the first dividing line 21 to fifth dividing line 25. The second dividing line 22 to fourth dividing line 24 extend to the cover piece 810.

The first cover piece 181 may be divided by a tenth dividing line 210. The tenth dividing line 210 is positioned at the boundary between the cover piece 810 and the front surface portion 81a, the rear surface portion 81b, and the side surface portion 81c. The cover piece 810 has a portion 810a demarcated by the 10th dividing line 210 and second dividing line 22, a portion 810b demarcated by the 10th dividing line 210, second dividing line 22, and third dividing line 23, and a portion 810c demarcated by the tenth dividing line 210 and third dividing line 23. The portion 810a covers the front surface of the end portion 13, the portion 810b covers the rear surface of the end portion 13, and the portion 810c covers the side surface of the end portion 13.

The second cover piece 82 may be divided by the fifth dividing line 25 and ninth dividing line 29. The fifth dividing line 25 is positioned at the boundary between the portion 82a corresponding to the end surface 3d and the portion 82b1 corresponding to the first side surface 3e. The ninth dividing line 29 is positioned at the boundary between the portion 82b1 and the portion 82b2 corresponding to the upper surface 7c.

In Embodiment 8, at least one of the first dividing line 21 to fifth dividing line 25, ninth dividing line 29, and tenth dividing line 210 divides the first cover piece 181 and second cover piece 182, and can divide them into 3 to 11 cover portions. Adjacent cover portions are connected to each other by stitching or adhesion.

Embodiment 9

Figure 17:
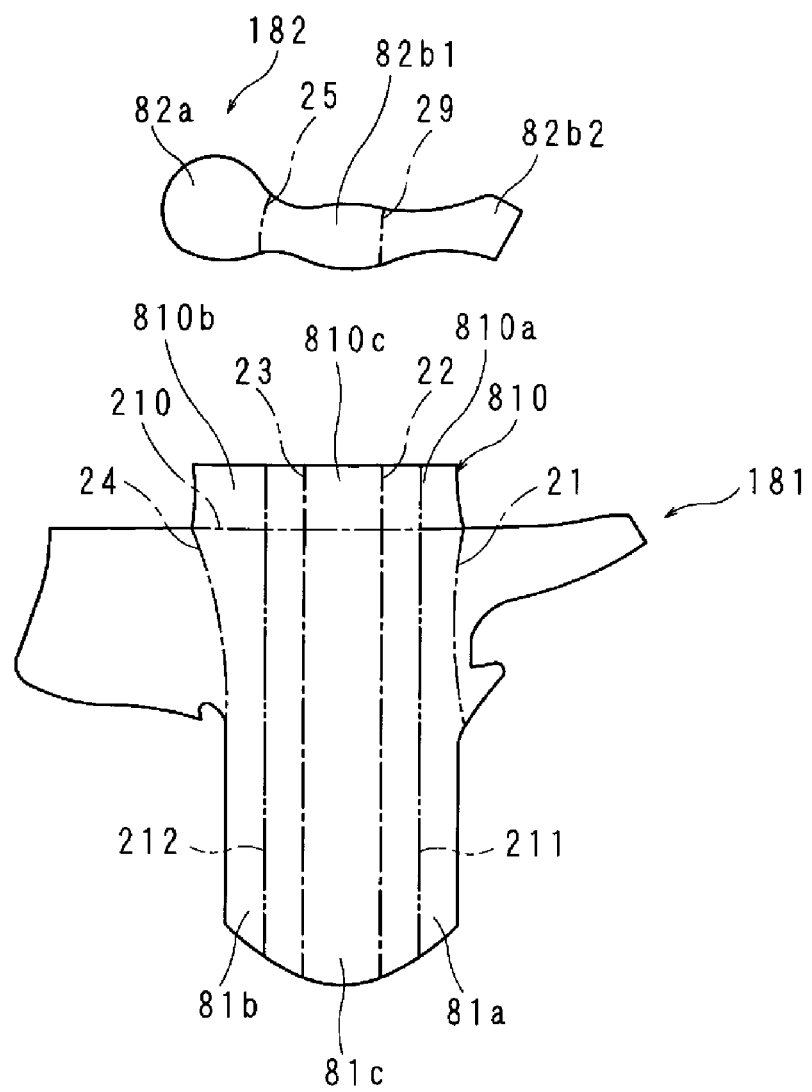
FIG. 17 is a front view illustrating a first cover piece and a second cover piece according to Embodiment 9.

Hereinafter, the present invention will be described with reference to the drawings illustrating the steering wheel according to Embodiment 9. Of the configurations according to Embodiment 9, the same configurations as those of Embodiments 1 to 8 are designated by the same reference numerals, and a detailed description thereof will be omitted. In Embodiment 9, the cover 8 includes the separated first cover piece 181 and the second cover piece 182 as in Embodiment 8, and is divided by the first dividing line 21 to fifth dividing line 25, the ninth dividing line 29, or the tenth dividing line 210. FIG. 17 is a front view illustrating the first cover piece 181 and the second cover piece 182.

As illustrated in FIG. 17, the first cover piece 181 may be further divided by an eleventh dividing line 211 or a twelfth dividing line 212. The eleventh dividing line 211 is positioned in the region of the front surface portion 81a and the portion 810a, and may divide the front surface portion 81a and the portion 810a.

The twelfth dividing line 212 is positioned in the region of the rear surface portion 81b and the portion 810b, and may divide the rear surface portion 81b and the portion 810b.

In Embodiment 9, at least one of the first dividing line 21 to fifth dividing line 25 and ninth dividing line 29 to twelfth dividing line 212 divides the first cover piece 181 and second cover piece 182, dividing them into 3 to 15 cover portions. Adjacent cover portions are connected to each other by stitching or adhesion.

Embodiment 10

Figure 18:
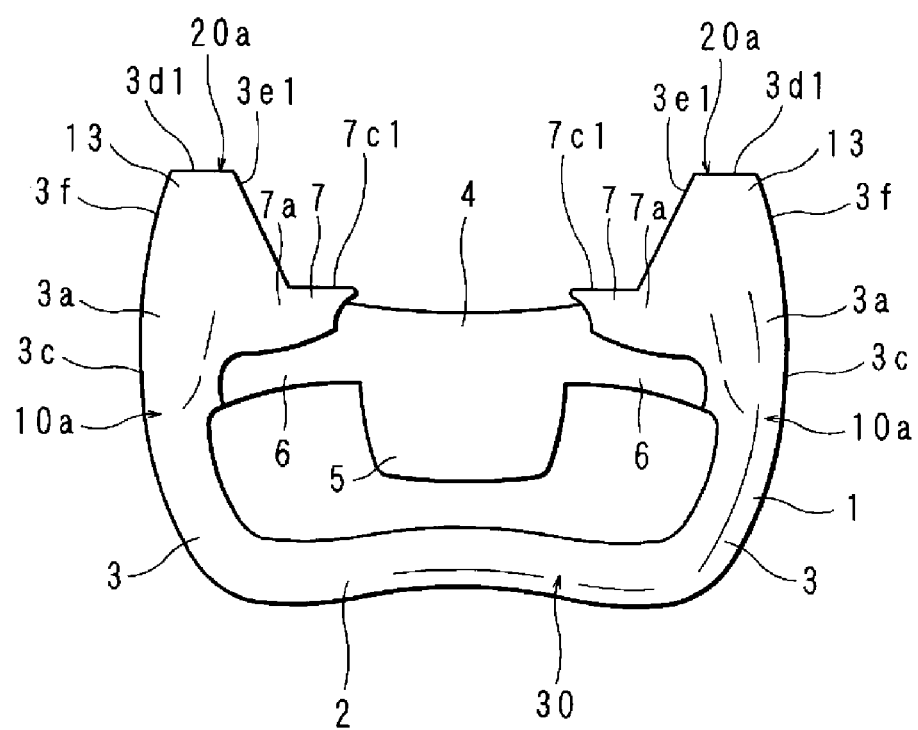
FIG. 18 is a front view illustrating the boss, rim, and spokes according to Embodiment 10.

Hereinafter, the present invention will be described with reference to the drawings illustrating the steering wheel according to Embodiment 10. Of the configurations according to Embodiment 10, the same configurations as those of Embodiments 1 to 9 are designated by the same reference numerals, and a detailed description thereof will be omitted. FIG. 18 is a front view illustrating the boss 4, the rim 1, and the spokes 7. The boss 4, the rim 1, and the spokes 7 according to Embodiment 10 have the same configurations as those of Embodiment 2 except for the upper surface 7c1, the first side surface 3e1, and the end surface 3d1. Here, the upper surface 7c1, the first side surface 3e1, and the end surface 3d1 will be described.

The upper surface 7c1, the first side surface 3e1, and the end surface 3d1 each form a flat square shape. The first side surface 3e1 is inclined with respect to the upper surface 7c1 and the end surface 3d1. As illustrated in FIG. 18, the upper surface 7c1 and the end surface 3d1 are substantially parallel to each other, and the first side surface 3e1, upper surface 7c1, and end surface 3d1 are connected so as to intersect linearly with each other.

Figure 19:
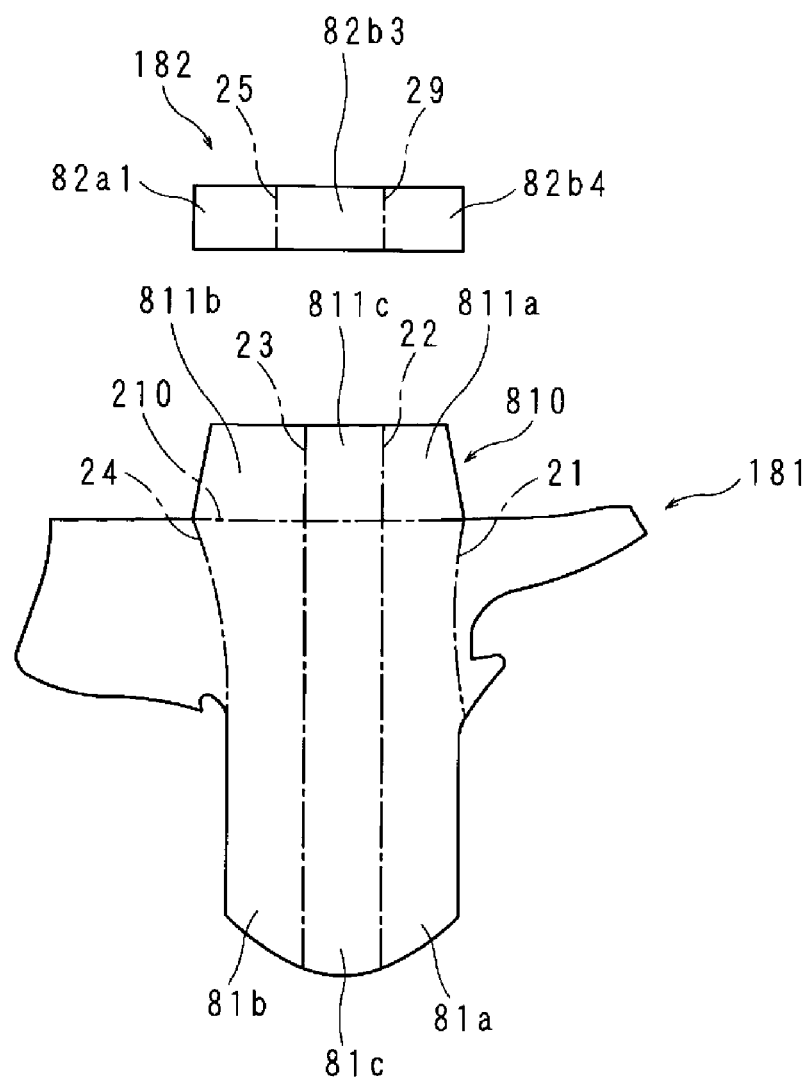
FIG. 19 is a front view illustrating a first cover piece and a second cover piece according to Embodiment 10.

The cover 8 includes the separated first cover piece 181 and the second cover piece 182, and is divided by the first dividing line 21 to fifth dividing line as in Embodiment 4. FIG. 19 is a front view illustrating the first cover piece 181 and the second cover piece 182. The cover 8 includes a cover piece 810 that covers the end portion 13 protruding upward from the protruding part 3. The second dividing line 22 to fourth dividing line 24 extend to the cover piece 810.

The cover piece 810 has a portion 811a demarcated by the 10th dividing line 210 and 2nd dividing line 22, a portion 811b demarcated by the 10th dividing line 210, second dividing line 22, and 3rd dividing line 23, and a portion 811c demarcated by the tenth dividing line 210 and third dividing line 23. The portion 811a covers the front surface of the end portion 13, the portion 811b covers the rear surface of the end portion 13, and the portion 811c covers the side surface of the end portion 13.

The second cover piece 82 has a rectangular strip shape and can be divided by the fifth dividing line 25 and ninth dividing line 29. The fifth dividing line 25 is positioned at the boundary between the portion 82a1 corresponding to the end surface 3d1 and the portion 82b3 corresponding to the first side surface 3e1. The ninth dividing line 29 is positioned at the boundary between the portion 82b3 and the portion 82b4 corresponding to the upper surface 7c1.

In Embodiment 10, at least one of the first dividing line 21 to fifth dividing line 25, ninth dividing line 29, and tenth dividing line 210 can divide the first cover piece 181 and second cover piece 182, and can divide them into 3 to 11 cover portions. Adjacent cover portions are connected to each other by stitching or adhesion.

In each of the Embodiments described above, the curved outer edge shape of the first cover piece 81 and the second cover piece 82 may include a shape represented approximately linearly. Further, the curved surfaces of the first cover piece 81 and the second cover piece 82 may include a shape approximately represented by a plane.

When a reference code is noted in a claim, the reference code is merely provided as a reference in correspondence with the reference code described in the embodiment in order to facilitate understanding of the claim. The scope of claims is not limited to the embodiments.

The embodiments presently disclosed are to be considered as examples for all points, and are not restrictive. The technical features described in the examples can be combined with each other, and the scope of the invention is intended to include all changes within the scope of the claims and a scope equal to the claims.

DESCRIPTION OF CODES

1: Rim
3: Protruding part
3a: Front surface
3b: Rear surface
3d: End surface
4: Boss
7: Spokes
7a: Front surface
7b: Rear surface
7c: Upper surface
8: Cover
81: First cover piece
82: Second cover piece
83: Third cover piece

The invention claimed is:

1. A steering wheel, comprising:
a boss configured to be connected to a steering shaft and a steering portion arranged around the boss, wherein the steering portion has a non-circular portion including a corner portion or an end portion, and the non-circular portion is covered with one or more cover pieces, the steering portion comprises a rim including a bottom portion and two protruding parts protruding from both sides of the bottom portion, and wherein the one or more cover pieces comprise:
a first cover piece configured to cover a first protruding part of the two protruding parts;
a second cover piece configured to cover a second protruding part of the two protruding parts; and
a third cover piece configured to cover the bottom portion.

2. The steering wheel according to claim 1, wherein the one or more cover pieces cover a front surface of the steering portion facing the occupant in the non-circular portion, a rear surface of the steering portion positioned on a side opposite the occupant, and an upper surface of the steering portion positioned between the front surface and the rear surface.

3. The steering wheel according to claim 2,
wherein the first cover piece covers the front surface and the rear surface; and further comprising a
fourth cover piece is connected to an edge portion of the first cover piece and covers the upper surface.

4. The steering wheel according to claim 2, wherein the first cover piece covers the front surface and the rear surface, and further comprising a fourth cover piece covers the upper surface.

5. The steering wheel according to claim 4, wherein at least one of the first cover piece and the second cover piece is divided into a plurality of cover portions.

6. The steering wheel according to claim 3, wherein
the steering portion includes a rim arranged around the boss and spokes protruding from the rim toward the boss,
the first cover piece covers the front surface facing the occupant and the rear surface positioned on the side opposite the occupant, and
the fourth cover piece is arranged on both the front surface and the rear surface, and covers the end surfaces of the rim extending from the front surface to the rear surface and the surface of the spokes arranged between the front surface and rear surface that extend between the end surface of the rim and the boss.

7. The steering wheel according to claim 6, wherein the rim and spokes are connected in an L-shape or a T-shape.

8. The steering wheel according to claim 6, wherein an outer edge of a portion of the fourth cover piece corresponding to the end surface of the rim is formed in a curved shape.

9. The steering wheel according to claim 6, wherein the fourth cover piece has a rectangular strip shape.

10. The steering wheel according to claim 3, wherein the steering portion includes a rim arranged around the boss, and the fourth cover piece covers an end portion of a discontinuity point in a circumferential direction of an outer diameter of the rim.

11. The steering wheel according to claim 1, wherein an edge portion of the one or more cover pieces is connected by stitching.

12. The steering wheel according to claim 1, wherein the one or more cover pieces are is made of leather or cloth.

13. The steering wheel according to claim 1, wherein the non-circular portion is positioned on an outer perimeter of the steering wheel.

14. The steering wheel according to claim 1, wherein the non-circular portion is configured to be gripped by a driver during operation.

* * * * *